United States Patent
Serackis et al.

(10) Patent No.: US 11,741,631 B2
(45) Date of Patent: Aug. 29, 2023

(54) REAL-TIME ALIGNMENT OF MULTIPLE POINT CLOUDS TO VIDEO CAPTURE

(71) Applicant: Vilnius Gediminas Technical University, Vilnius (LT)

(72) Inventors: Arturas Serackis, Vilnius (LT); Dalius Navakauskas, Vilnius (LT); Dalius Matuzevicius, Vilnius (LT); Darius Plonis, Vilnius (LT); Andrius Katkevicius, Vilnius (LT); Tomyslav Sledevic, Vilnius (LT); Vytautas Abromavicius, Vilnius (LT)

(73) Assignee: Vilnius Gediminas Technical University, Vilnius (LT)

( * ) Notice: Subject to any disclaimer, the term of this patent is extended or adjusted under 35 U.S.C. 154(b) by 131 days.

(21) Appl. No.: 17/376,168

(22) Filed: Jul. 15, 2021

(65) Prior Publication Data
US 2023/0015751 A1 Jan. 19, 2023

(51) Int. Cl.
*G06T 7/73* (2017.01)
*G06T 7/246* (2017.01)
(Continued)

(52) U.S. Cl.
CPC .............. *G06T 7/75* (2017.01); *G06F 18/22* (2023.01); *G06T 7/251* (2017.01); *G06V 20/46* (2022.01); *G06V 20/48* (2022.01); *G06V 10/759* (2022.01)

(58) Field of Classification Search
CPC . G06T 7/75; G06T 7/251; G06T 2207/10016; G06T 2207/10028;
(Continued)

(56) References Cited

U.S. PATENT DOCUMENTS

| 7,187,809 B2 | 3/2007 | Zhao |
| 7,860,301 B2 | 12/2010 | Se |

(Continued)

FOREIGN PATENT DOCUMENTS

| WO | WO-2006083297 A2 * | 8/2006 | ......... G06K 9/00214 |
| WO | WO-2021180295 A1 * | 9/2021 | ......... G06K 9/00201 |

OTHER PUBLICATIONS

Dynamic Adaptive Point Cloud Streaming—2018 (Year: 2018).*
(Continued)

*Primary Examiner* — Nizar N Sivji
(74) *Attorney, Agent, or Firm* — Meunier Carlin & Curfman LLC

(57) ABSTRACT

The presented invention includes the generation of cloud points, the identification of objects in the cloud points, and, in this case, finding the positions of objects in cloud points. In addition, the invention includes capturing images, data streaming, and digital image processing in different points of the system, and calculation of the position of objects. The invention includes the usage of cameras of mobile smart devices, smart glasses, 3D cameras, but not necessarily. The data streaming provides video streaming and sensor data streaming from mobile smart devices. The presented invention further includes cloud points of buildings in which the positioning of separated objects could be implemented. It also consists of the database of cloud points of isolated objects which help to calculate the position in the building. Finally, the invention comprises the method of objects feature extraction, comparing in the cloud points and position calculation.

4 Claims, 9 Drawing Sheets

(51) Int. Cl.
*G06V 20/40* (2022.01)
*G06F 18/22* (2023.01)
*G06V 10/75* (2022.01)

(58) Field of Classification Search
CPC ......... G06T 7/254; G06F 18/22; G06V 20/46; G06V 20/48; G06V 10/759
See application file for complete search history.

(56) References Cited

U.S. PATENT DOCUMENTS

| | | | |
|---|---|---|---|
| 8,305,430 | B2 | 11/2012 | Oskiper |
| 8,717,414 | B2 | 5/2014 | Kang |
| 8,879,828 | B2 | 11/2014 | Bell |
| 9,053,555 | B1 | 6/2015 | Ogale |
| 9,405,972 | B2 | 8/2016 | Moeglein |
| 9,562,971 | B2 | 2/2017 | Shenkar |
| 9,918,204 | B1 | 3/2018 | Cote |
| 9,947,111 | B2 | 4/2018 | Liu |
| 10,217,021 | B2 | 2/2019 | Roimela |
| 10,380,410 | B2 | 8/2019 | Gold |
| 10,481,265 | B2 | 11/2019 | Coddington |
| 10,670,404 | B2 | 6/2020 | Roumeliotis |
| 10,769,442 | B1* | 9/2020 | Ding ............... G06T 7/254 |
| 10,805,595 | B2 | 10/2020 | Karvounis |
| 10,997,783 | B2 | 5/2021 | Jurgenson |
| 2008/0310757 | A1 | 12/2008 | Wolberg |
| 2017/0061632 | A1 | 3/2017 | Lindner |
| 2020/0005485 | A1* | 1/2020 | Xu ..................... G06T 7/60 |
| 2020/0314435 | A1* | 10/2020 | Tourapis .............. G06T 7/74 |
| 2021/0370968 | A1* | 12/2021 | Xiao .................. G01S 17/86 |

OTHER PUBLICATIONS

Wide-Area Scene Mapping for Mobile Visual Tracking—2012 (Year: 2012).*
Incident-Supporting Visual Cloud Computing Utilizing Software-Defined Networking—2017 (Year: 2017).*
Live Metric 3D reconstruction on mobile phone—2013 (Year: 2013).*
Wang, J., Zhu, M., Sun, D., Wang, B., Gao, W., & Wei, H. (2019). MCF3D: multi-stage complementary fusion for multi-sensor 3D object detection. IEEE Access, 7, 90801-90814.
Griffiths, D., & Boehm, J. (2019). Improving public data for building segmentation from Convolutional Neural Networks (CNNs) for fused airborne lidar and image data using active contours. ISPRS Journal of Photogrammetry and Remote Sensing, 154, 70-83.
Wang, H., Lou, X., Cai, Y., Li, Y., & Chen, L. (2019). Real-time vehicle detection algorithm based on vision and lidar point cloud fusion. Journal of Sensors, 2019.
Liu, H., Han, X., Li, X., Yao, Y., Huang, P., & Tang, Z. (2019). Deep representation learning for road detection using Siamese network. Multimedia Tools and Applications, 78(17), 24269-24283.
Ji, H., & Luo, X. (2019). 3D scene reconstruction of landslide topography based on data fusion between laser point cloud and UAV image. Environmental Earth Sciences, 78(17), 1-12.
Cho, S., & Cho, K. (2019). Real-time 3D reconstruction method using massive multi-sensor data analysis and fusion. The Journal of Supercomputing, 75(6), 3229-3248.
Che, E., Jung, J., & Olsen, M. J. (2019). Object recognition, segmentation, and classification of mobile laser scanning point clouds: A state of the art review. Sensors, 19(4), 810.
Person, M., Jensen, M., Smith, A. O., & Gutierrez, H. (2019). Multimodal fusion object detection system for autonomous vehicles. Journal of Dynamic Systems, Measurement, and Control, 141(7).
Zhang, P., Zhao, Q., Tannant, D. D., Ji, T., & Zhu, H. (2019). 3D mapping of discontinuity traces using fusion of point cloud and image data. Bulletin of Engineering Geology and the Environment, 78(4), 2789-2801.
Li, M., Hu, Y., Zhao, N., & Qian, Q. (2019). One-Stage Multi-Sensor Data Fusion Convolutional Neural Network for 3D Object Detection. Sensors, 19(6), 1434.

* cited by examiner

REAL-TIME ALIGNMENT OF MULTIPLE POINT CLOUDS TO VIDEO CAPTURE

BACKGROUND OF THE INVENTION

Field of the Invention

The goal of the invention is a system and method for depth map changes detection using a local point cloud estimation and comparison to a reference point cloud. Embodiments described herein relate to estimation of foreground depth from camera pixel intensity values; converting depth information to a specific description format; conversion of point clouds, estimated using a laser scanning device to a compatible format; and a procedure for real-time search of the correspondence between two depth descriptions, received from different sources.

Description of Related Art

Detection of depth map changes has many different applications, including anomaly detection, monitoring environment changes, searching if something is missing inside of the building, etc. Additionally, rapid indoor navigation is becoming an increasingly important issue in the modern world. Measurements of already built buildings are another important area. The method presented in this invention allows us to improve the areas mentioned above.

Many practical applications lack the high-precision, absolute measurement feature on a smartphone. Current devices are able to perform only relative measurements from image sensor data. The absolute depth measurements could not be performed using a single image or image sequence only. In modern smartphones, a number of additional sensors give a possibility to perform higher accuracy measures of the objects captured by the phone camera sensor. Still, mobile LiDAR or Time-of-Flight cameras have low resolution and are not available in most smart devices.

In scenarios where a user might need location tracking or visual analysis of an area, state-of-the-art technologies primarily rely on global tracking services for outdoor environments or wifi, RDIF, bluetooth, or other location sensors which are pre-installed in indoor environments. Real-time location tracking based on video data alone is a complex problem, and the present invention provides a solution that is practical for various types of mobile devices and does not require a user device to use high-precision video, high-precision scanning devices, or positioning sensors.

The invention introduces a fusion of point cloud data, estimated after application of photogrammetry algorithms, data captured from inertial measuring units, and fragments of the high precision point cloud data, collected with a high-precision scanning device, such as LiDAR.

SUMMARY OF THE INVENTION

The invention concerns a system and method for real-time analysis of an environment captured by a mobile video camera with a set of additional on-board sensors. The method describes a process for camera localization and anomaly detection in depth maps by comparison of a local point cloud to a reference point cloud to estimate depth map changes. The reference point cloud is compiled from a sequence of video frames and extracted segments of a detailed environment point cloud and measured using a high-precision scanning device. The system consists of four main parts: a mobile environment, a video stream processing service, a point cloud matching service, and a point cloud database.

The present invention involves initially pre-capturing large scale point clouds, covering either wide areas of a building or an outside environment. Usually the initial, reference point cloud is estimated using LiDAR technology. However, high precision photogrammetry-based or an alternative technology, which is capable of producing a high-precision point cloud, can be used as a reference for measurement or point cloud matching. Together with the reference point cloud, our solution uses a local point cloud that is estimated in real-time. Such local point clouds may use analysis of a video stream received from mobile smart devices or low-precision hand-held LiDAR devices. The structure-from-motion based point cloud estimation is based on low-precision camera position tracking from inertial measurement sensor data and is used to prepare a local point cloud for matching to a reference point cloud, such that the location and orientation of the local point cloud with respect to the reference point cloud is not initially known.

BRIEF DESCRIPTION OF THE DRAWINGS

The provided system and method will be better understood from the following detailed descriptions together with detailed accompanying drawings, wherein.

DETAILED DESCRIPTION OF SPECIFIC EMBODIMENTS

The following detailed description is just one embodiment of the usage of the system and method. The structure and sequences of actions are shown according to the particular embodiment of system usage, however other arrangements of the described features are possible while still being encompassed by the claimed invention.

Our approach involves initially pre-building large scale point clouds, covering either wide areas of a building or an outside environment. Usually the initial, reference point cloud is estimated using LiDAR technology. However, high precision photogrammetry-based or an alternative technology, which is capable of producing a high-precision point cloud, can be used as a reference for measurement or point cloud matching. Together with the reference point cloud, our solution uses a local point cloud that is estimated in real-time. Such local point clouds may use analysis of a video stream received from mobile smart devices or low-precision hand-held LiDAR devices. The structure-from-motion based point cloud estimation is based on low-precision camera position tracking from inertial measurement sensor data and is used to prepare a local point cloud for matching to a reference point cloud, such that the location and orientation of the local point cloud with respect to the reference point cloud is not initially known.

Figure 1:
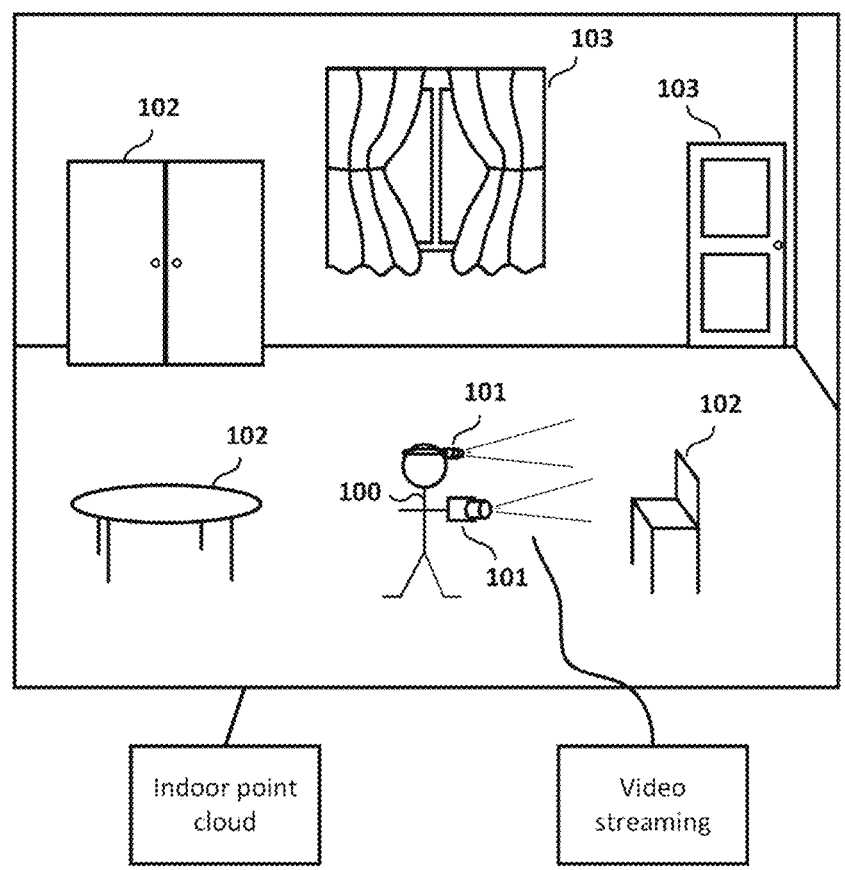
FIG. 1 is a block diagram of an application of a preferred embodiment of the invention, depicting a person in a room holding the camera of a smartphone or smart glasses, which may be used for real-time video streaming. The video stream is used for matching with a reference point cloud of the room to detect depth map changes after local point cloud alignment in the reference point cloud.

FIG. 1 is a schematic diagram of an application of the preferred embodiments of the invention. In the figure, a person (100) who holds a camera of a smartphone or smart glasses (101) and takes a low-resolution streaming video of objects or obstacles (102) in the room or elements of walls like doors and windows (103). All of these objects are static and can be used for the analysis of the orientation in the room. The video is continually captured while the person moves around the room and is processed using a video stream processing service, which may run (being implemented) on the same video capture device, to produce an estimate of the local point cloud. An exact or similar model of the environment is stored on a server as a reference point cloud. The estimation of device position relative to the reference point cloud of the environment is performed first and estimation of the device orientation, second. The relative device orientation with respect to the reference point cloud, that was estimated previously, may be processed partially on the device and partially on a server, or alternatively, fully processed on a server. The system locates the position of the camera in the reference point cloud in the point cloud database and performs local point cloud matching with the reference point cloud in real-time.

Figure 2:
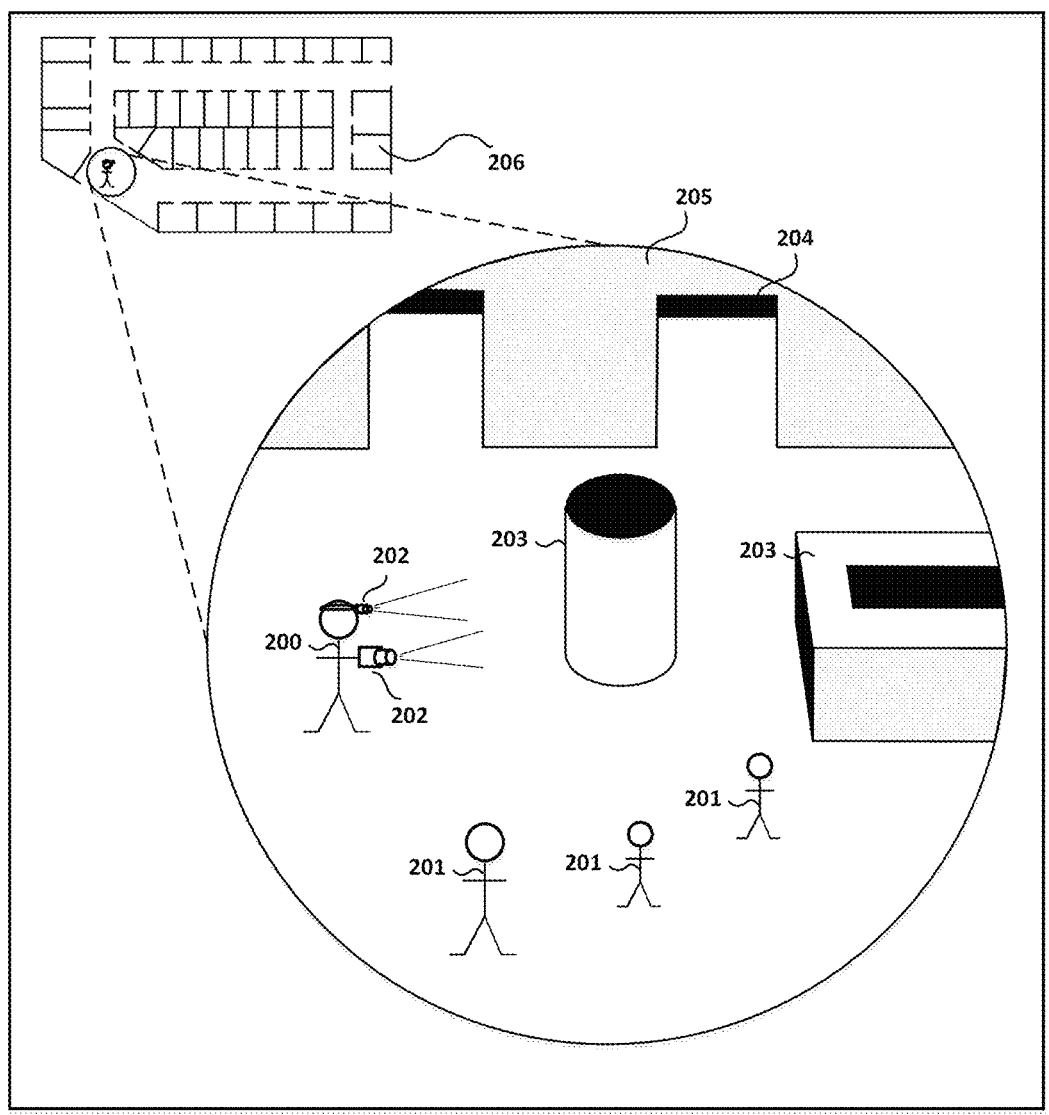
FIG. 2 is a depiction of the application of a preferred embodiment of the invention showing a plan of a big building, e.g., supermarket or factory, with an enlarged fragment illustrating objects and obstacles to detect by matching the local point cloud with a reference point cloud.

FIG. 2 is a further application of the preferred embodiments of the invention. In the figure a plan of the floor of a large building (206) is shown, for example, a supermarket or factory, but it could also be any other type of building. A fragment of the building is enlarged (205) in which a person (200) walks and takes a video with a camera (202) and streams the video to the video stream processing service (301) for the purpose of indoor navigation and of searching for changes in the environment. In other examples, the purpose of the system application may be different, such as real-time measurements of construction changes in a building and others. Various objects and obstacles can aid in implementing indoor navigation. Static objects like titles of stores (204), sales tables with commercials, billboards (203) are used for matching the objects with those stored in the database. Also, attention to other obstacles, like other walking persons (201) could be detected by the real-time alignment of multiple point clouds. The system locates a person, indicating an anomaly in the reference point cloud, by matching objects captured by the video camera to related parts of the point cloud that represent the building (e.g., after the building was scanned using LiDAR).

Figure 3:
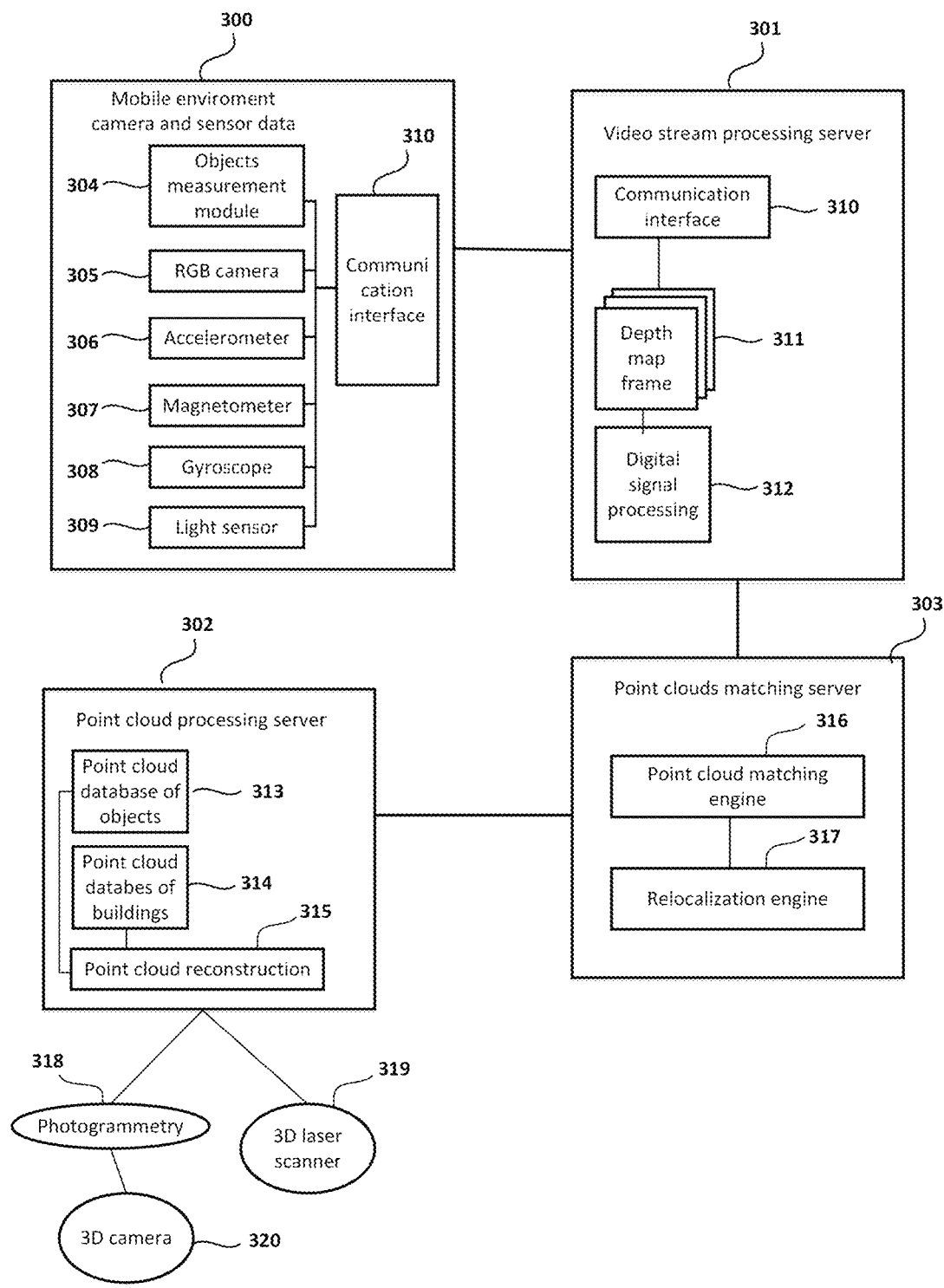
FIG. 3 is a structural diagram of all systems components including a real-time camera tracker, a video stream processing service, a point clouds processing service, point clouds of the object matching service, and all other necessary components.

FIG. 3 represents the whole system of real-time alignment of multiple point clouds to the captured video. The system consists of a real-time camera tracker (300), which is able to send a video stream using internet connection with through-put sufficient for streaming the selected video resolution and frame rate in compressed form, a video stream processing service (301), a point cloud processing service (302), and a point cloud matching service (303). The video stream processing service, point cloud processing, and point cloud matching service are housed in computing devices, such as a mobile devices, computer servers, or any computer processing device with local memory components. For application into real systems, the video stream processing service may be configured on the mobile device of the user or on a separate computer processing device, in either configuration, the mobile device relies on wireless communication to the point cloud matching service or to the video stream processing service, respectively. The point cloud processing service may be on a separate or the same computer processing device as the point cloud matching service. If the point cloud processing and point cloud matching services are one separate computer processing devices, then they are connected by wireless or wired communication means. The environment is captured using a mobile camera and sensor data module (300), which includes an inertial measurement unit consisting of accelerometer (306), magnetometer (307), and gyroscope (308); light sensors (309); RGB camera (305); and objects measurement module (304)—a software component using structure from motion estimation and sensor fusion algorithms for depth estimation and approximate prediction of object's absolute dimensions. The object measurement module performs capturing, initial analysis of the video stream received from the camera, and measures the distances from specified objects. Further, the dedicated digital signal processing algorithms (312) are separately applied for data captured in parallel to each video frame (311).

Pre-captured, reference point clouds of each building or object that need to be stored on the point cloud database can be initially received using a LiDAR scanner (319) or other high-precision photogrammetry tools. The pre-captured, reference point clouds, estimated while moving a video-capture device (dynamically changing point clouds), can be estimated using an RGB or other camera (320) or a smart portable device with low-precision photogrammetry software (318). Pre-captured point clouds can be reconstructed (315) to form bigger point clouds of buildings (314) and separated objects (313), which are stored in the database. The matching of point clouds (316) is performed by the point cloud matching service. The identified objects can be used to determine the exact indoor location of a person.

Figure 9:
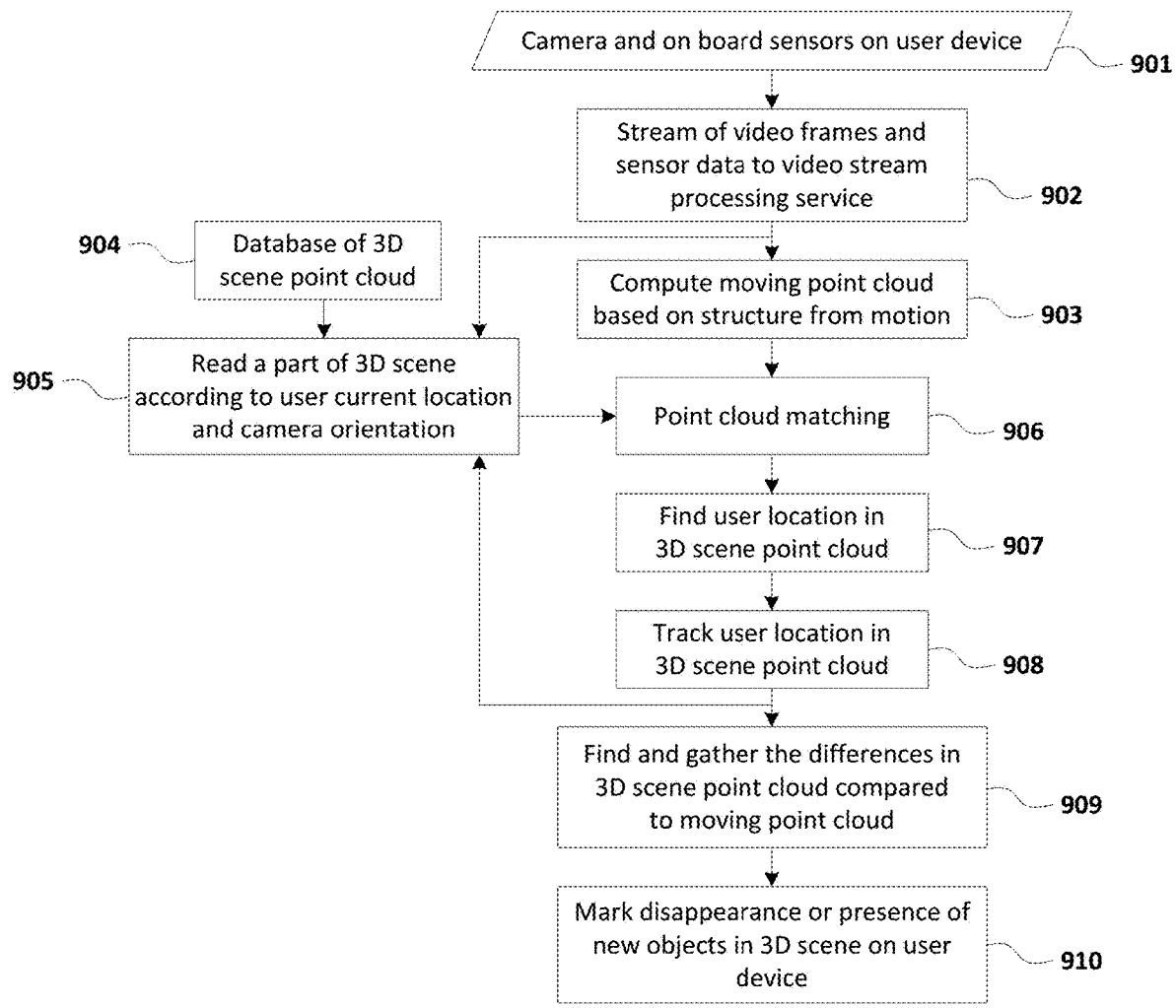
FIG. 9 is a schematic representation of the overall method for this invention.

A schematic representation of the general flow-chart for this invention is shown in FIG. 9. A video capture device (901) with inertial measurement unit sensors is needed to produce a video stream with additional sensor data (902) which are used together to estimate a local point cloud. The video stream and the sensor data are synchronized in time then processed using dedicated sensor fusion algorithms and structure from motion estimation algorithms (903). A database of pre-captured point clouds (904) is used as a reference for user camera location estimation and anomalies in the environment detection. A part of the reference point cloud is selected (905) using context information, such as detecting objects in the video stream using the object detection module 304 and matching to objects detected in the pre-captured reference point cloud using AI-based semantic segmentation of the reference point cloud, which can be done in advance or in an offline mode. Semantic segmentation of the reference point cloud is performed using AI-based mathematical models, with 3D input (unlabeled elements of the point cloud) and 3D output (labeled elements of the point cloud), trained for recognition of selected several types of objects (e.g. chair, table, door, window, stage spotlight, stage loudspeaker, etc.). The selected segment of the reference point cloud is used for matching (906) with the local point cloud estimated from video stream data (903). The local point cloud matching with the reference point cloud produces the updated user location (907), which additionally is used to predict the next user position using a 3D tracking algorithm (908) based on Kalman adaptive filter or alternative linear or nonlinear adaptive filter. The local point cloud is used to estimate precise camera orientation and search for differences between aligned local point cloud and the reference pre-captured point cloud (909). Any anomaly, found after precise point clouds matching process, is sent to the user device as a set of parameters, sufficient to visualize the disappearance or presence of new objects in a 3D scene on the user device in graphical or in text form (910).

Figure 4:
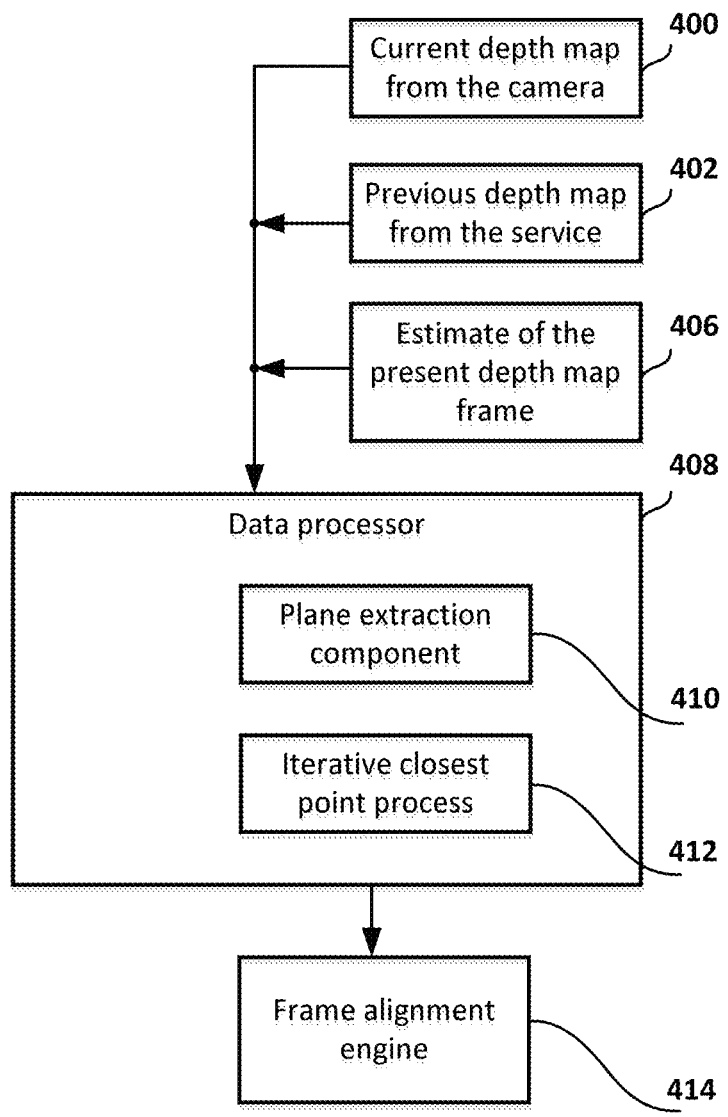
FIG. 4 is a frame alignment engine.

FIG. 4 represents the frame alignment engine. 408 is a data processor, implemented on an electronic device or parallel devices configured to perform mathematical computations (416). The frame alignment engine is used for camera orientation estimation, receives the current depth map (400) based on a local point cloud from the mobile camera, retrieves from local memory of the video processing service (402) a depth map frame based on a pre-captured point cloud and an estimate of the present depth map frame based on previous depth map frame (406). The output of the frame alignment engine is a matrix of parameters (414) used for anomaly detection and visualization of environment changes. The frame alignment engine consists of a plane extraction component (410) and an iterative closest point (ICP) process (412), which is further detailed in FIG. 5.

Figure 5:
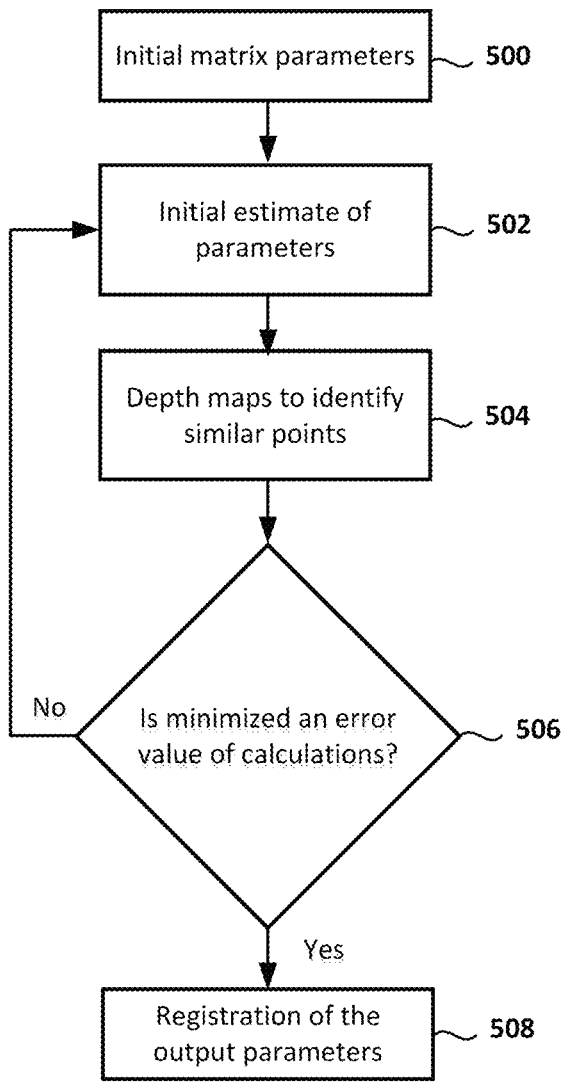
FIG. 5 is an ICP (Iterative Closest Point) process algorithm.

FIG. 5 represents the ICP process. An estimate of initial matrix parameters (500) can be user movement state, user movement metadata, map data, RGB camera output, orientation sensor output, GPS data, or a prediction of camera position using context location prediction based on object detection or information about the previous location, motion, and velocity of the camera. Using the initial estimate of parameters, computation of pairs between similar points between the current and previous frames is performed (502), which is further detailed in FIG. 6. A pair of similar points is two points from two depth maps, and those points are estimated to have arisen from the two consecutive frames in a scene. The term "point" is used here to refer to a pixel or a group of neighboring pixels. The method described herein can use shapes of the depth maps to identify similar points or can work without the need to find shapes in the depth maps. An updated estimate of the matrix parameters is calculated, which minimizes the error value obtained when similar points are computed (504). When convergence has been reached (506), updated matrix parameters are used as an initial, lower precision matching result (508), that is later used as a start point for camera orientation estimation and higher precision alignment, explained in FIG. 6. If convergence is not reached in the updated estimate, the computation and calculation process is repeated.

Figure 6:
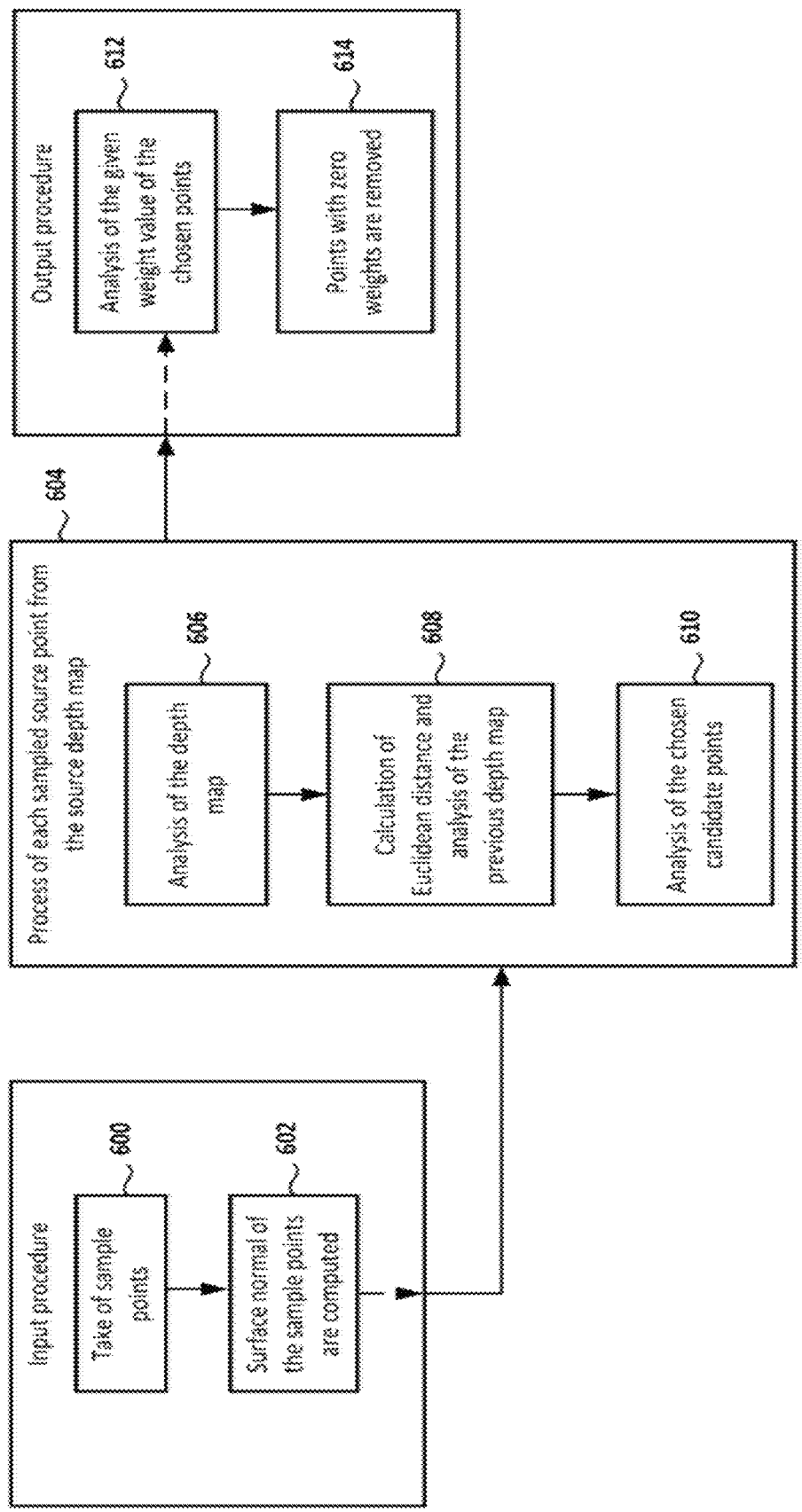
FIG. 6 is a depth map process management.

FIG. 6 represents the point matching process, used in point cloud matching service for camera orientation estimation. Sample points are taken from the current and previous depth maps. Those sample points are used as candidates to find pairs of similar points (600), and the surface normals of the sample points or a group of points are computed (602). For example, for each sample point, two or more nearest neighbor points are found, which are used to define a surface containing a sample point and its nearest neighbor points. Then, for a determined surface, the normal to the surface is calculated (602). After all sample points have been used to evaluate a surface normal, process 604 begins. For all sample points of the previous depth map, a mathematical vector is projected from the camera location coordinates to the point in the current depth map, which is called the camera direction of projection (606). A sampled point from the current depth map is chosen as a candidate which is within a certain Euclidean distance to the sample point of the previous depth map and has a similar surface normal as the point in a previous depth map (608). Chosen candidate points are then paired with their corresponding points of the previous depth map (610). Process 604 is repeated for each sampled point until all points have been chosen. Based on the Euclidian distance, the number of points, and other metrics, each chosen point is given weight value (612), which is used later to filter out the outliers of matching process. Points with zero weights are removed (614). Weights can be set to zero if points are determined unusable or found on a plane or on an object of no interest.

Figure 7:
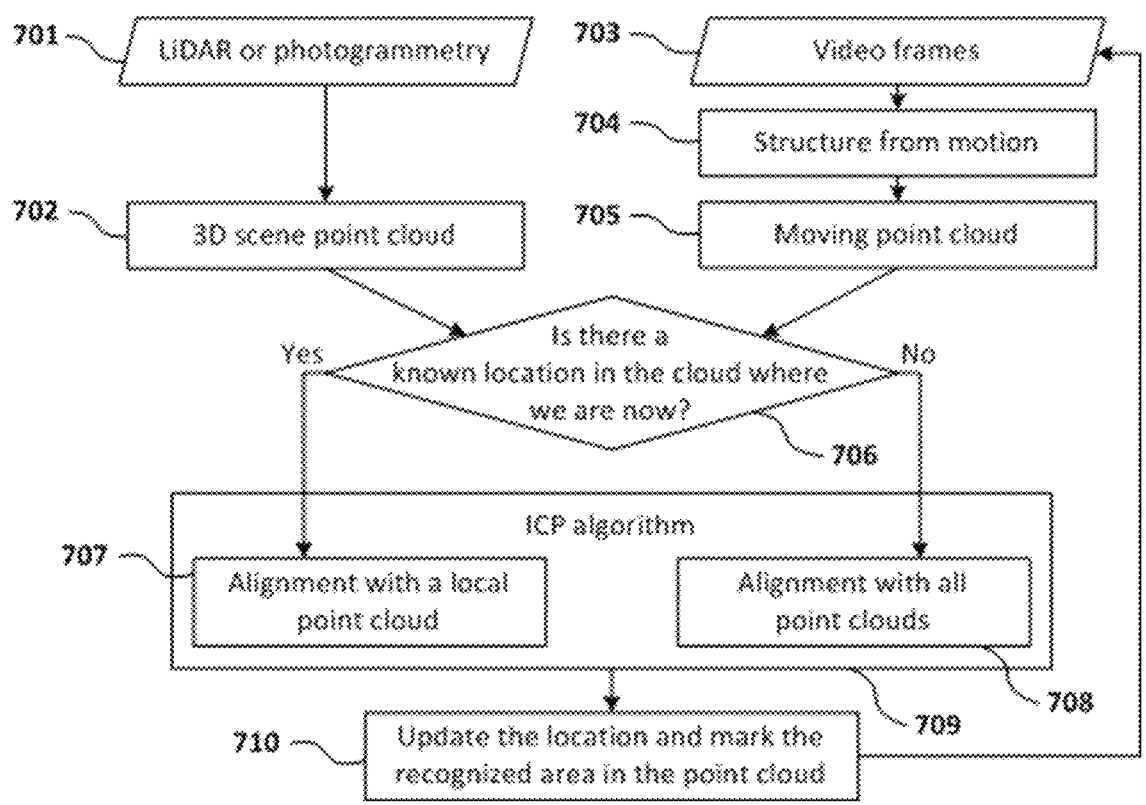
FIG. 7 is a flowchart of a method for mapping 2D images of a scene to a 3D point cloud of a view.

FIG. 7 represents the synchronization of 2D images with 3D point clouds of a scene. After LiDAR scanning or photogrammetry are pre-captured (701), the point cloud is saved in .pcd or .ply format (702). The area is divided into segments, and the corresponding reference point cloud segments are prepared. Depending on the accuracy of the scan (density of the estimated reference point cloud), the point cloud can be converted to a lower density, thus speeding up the calculations by thinning the points in the cloud. Since the image frames cannot be directly aligned with the point cloud, the SFM (Structure from Motion) algorithm (704) computes a new moving point cloud (705) of the captured frame (703). Based on the IMU sensor data, it is determined with which reference point cloud segment the new moving point cloud (705) will be aligned. If the original location of the camera is not known in the point cloud of the room, then the moving cloud is aligned with all point clouds (708). The ICP (Iterative Closest Point) algorithm is used for point cloud alignment (709). If the current location of the camera is estimated in a 3D scene point cloud, then to accelerate the alignment process, the moving point cloud is aligned with a reference point cloud (707). Periodically updated information about the location of the camera in the point cloud (710), together with information from position sensors, is used to accelerate the alignment phase. After recognizing the location from which the image is being filmed, information about the recognized area in the point cloud can be transmitted to the mobile device.

Figure 8:
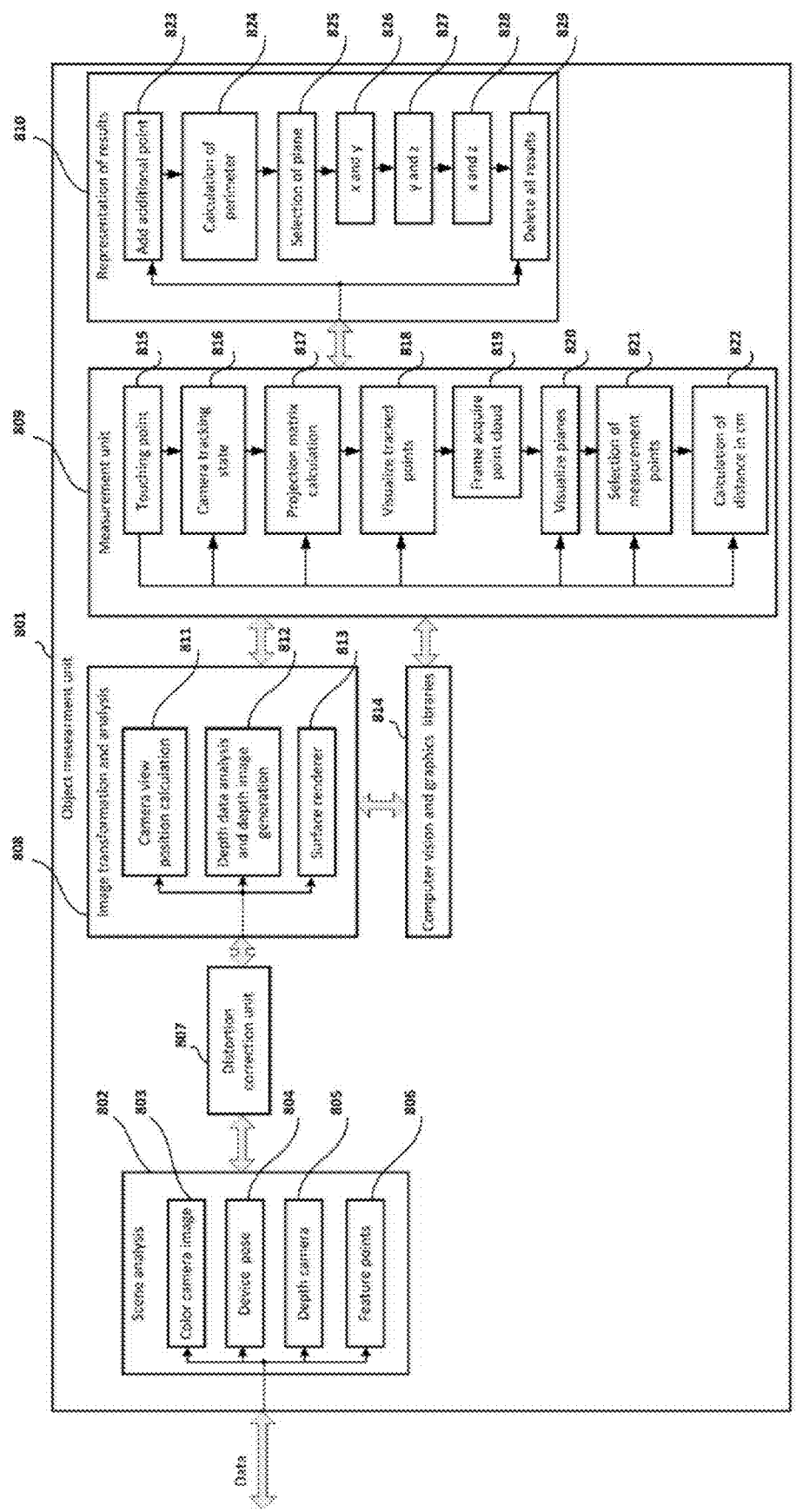
FIG. 8 is a schematic representation of an object measurement module.

FIG. 8 is a schematic representation of the object measurement module, which can be used as a source of additional parameters for local point cloud initial location prediction in the pre-captured point cloud. The object measurement module (801) is based on specialized third party functions library running on the smartphone or similar services running in the cloud. The scene analysis module (802) includes color camera images (803), a device pose module (804), a depth camera (805), and performs feature points analysis (806). The distortion correction unit (807) removes image distortion and also performs a camera calibration function, which is divided into two types: 1. Field of View (FoV) camera model; 2. Brown's distortion model, with a specific parameter vector. The distortion correction unit (807) also performs analysis of the depth image obtained by the depth camera (805). The image transformation and analysis module (808) includes camera view position calculation (811) using smart device sensors such as accelerometer and gyroscope; depth data analysis and depth image generation (812), which calculates a depth value corresponding to each pixel having integer coordinates by using information calculated by the camera view position calculation module (811); surface renderer module (813) manages an EGL (EGL is an interface between Khronos rendering APIs) display, which enables the open graphical library to render into a surface. The computer vision and graphics libraries module (814) includes open-source computer vision and graphics libraries, for example, OpenCV and OpenGL. The measurement unit calculates the distance between two marked points (809). Unit 809 includes a touching point function (815) wherein the user has to choose points of the object if he wants to measure the distance between points, a camera tracking state (816), which recalculates camera view, camera perspective, and light intensity, and a projection matrix calculation function (817). A visualize tracked points function (818) takes information from the cloud points, analyzes it, and updates if it is necessary. Function 818 works with the frame acquire point cloud function (819). The plane visualization function (820) shows planes where object measurements can be performed. By using the selection of measurement points function (821), a user can select more than one point of the object. The distance between two or more marked points of a user can be calculated by using function 822. The representation of results module (810) shows measurement results. Module 810 includes an add additional point function (823) such that, by using this function, a user can add one more points to the measurement, and the function (823) sends data to the measurement points function (821). Module 810 also includes functions for calculation of perimeter (824) of the object and selection of plane function (825), which consists of three subfunctions 826, 827 and 828. By using function 825, a user can choose in which direction or plane he wants to add a point marker. The delete all results function (829) will delete all activated measurement results so that the user can repeat measurements.

The invention claimed is:

1. A method for real-time indoor or outdoor environment analysis and continuous measurement of a captured object's position, comprising:
   capturing a video stream continuously on a mobile device;
   capturing motion sensor data continuously from motion sensors which are integrated with the mobile device, wherein the motion sensors are accelerometer, gyroscope, and magnetometer;
   synchronizing in time the video stream captured on the mobile device with the motion sensor data;
   transferring the video stream and the motion sensor data to a video stream processing service in parallel using the same or separate data streaming protocols;
   computing a moving point cloud from the video stream and motion sensor data using video and motion data fusion algorithms;
   estimating an initial location of the mobile device by identifying a reference object in the moving point cloud using an object detection algorithm and then querying for similar objects in a higher-resolution pre-captured point cloud of a point cloud database using semantic identification algorithms by artificial intelligence means;
wherein, the following steps are repeated while the video stream is being captured:
   extracting a set of point cloud segments-candidates from the moving point cloud and from the pre-captured point cloud corresponding to the initial location estimate or a previously determined location by parametrization of the moving point clouds using a chain of filters with coefficients, wherein the coefficients are estimated using a mathematical iterative algorithm;
   matching the moving point cloud to the set of pre-captured point cloud segments-candidates, wherein object features and euclidean distance measurements are used to find the intersections of the moving and pre-captured point cloud segments;
   producing a 3D representation of the environment surface that is captured on the mobile device;
   determining the location of the mobile device in the 3D representation using the initial location estimate or known previous location;
   tracking the location of the mobile device in the 3D representation; and
wherein, after capturing of video stream has been stopped, the following steps are executed:
   finding and gathering differences in the 3D scene representation to the moving point cloud; and
   marking disappearance or presence of new objects in the 3D scene representation.

2. The method of claim 1, further comprising organizing, clusterizing, and filtering video frames from the video stream using a chain of image filters for fast feature point extraction, feature point matching, and depth image candidates estimation.

3. The method of claim 1, further comprising processing inertial measurement unit signals by a chain of filters to compensate for signal drift and measurement errors including estimating a relative position of the device and estimating the changes of the relative positions at fixed time intervals.

4. The method of claim 1, further comprising selecting features on the mobile device video rendering, calculating the distance of selected features, and transmitting said selected features and said calculated distance to the video stream processing service together with the moving point cloud and motion data by the same or separate data streaming protocols.

* * * * *